Jan. 29, 1963  P. F. GIBBS  3,075,629
EGG ORIENTATING MECHANISM
Filed Oct. 5, 1961  3 Sheets-Sheet 1

INVENTOR
Peter F. Gibbs
BY Wenderoth, Lind
and Ponack,
ATTORNEY

Jan. 29, 1963 P. F. GIBBS 3,075,629
EGG ORIENTATING MECHANISM
Filed Oct. 5, 1961 3 Sheets-Sheet 2

INVENTOR
Peter F. Gibbs
BY Wenderoth, Lind
and Ponack,
ATTORNEY

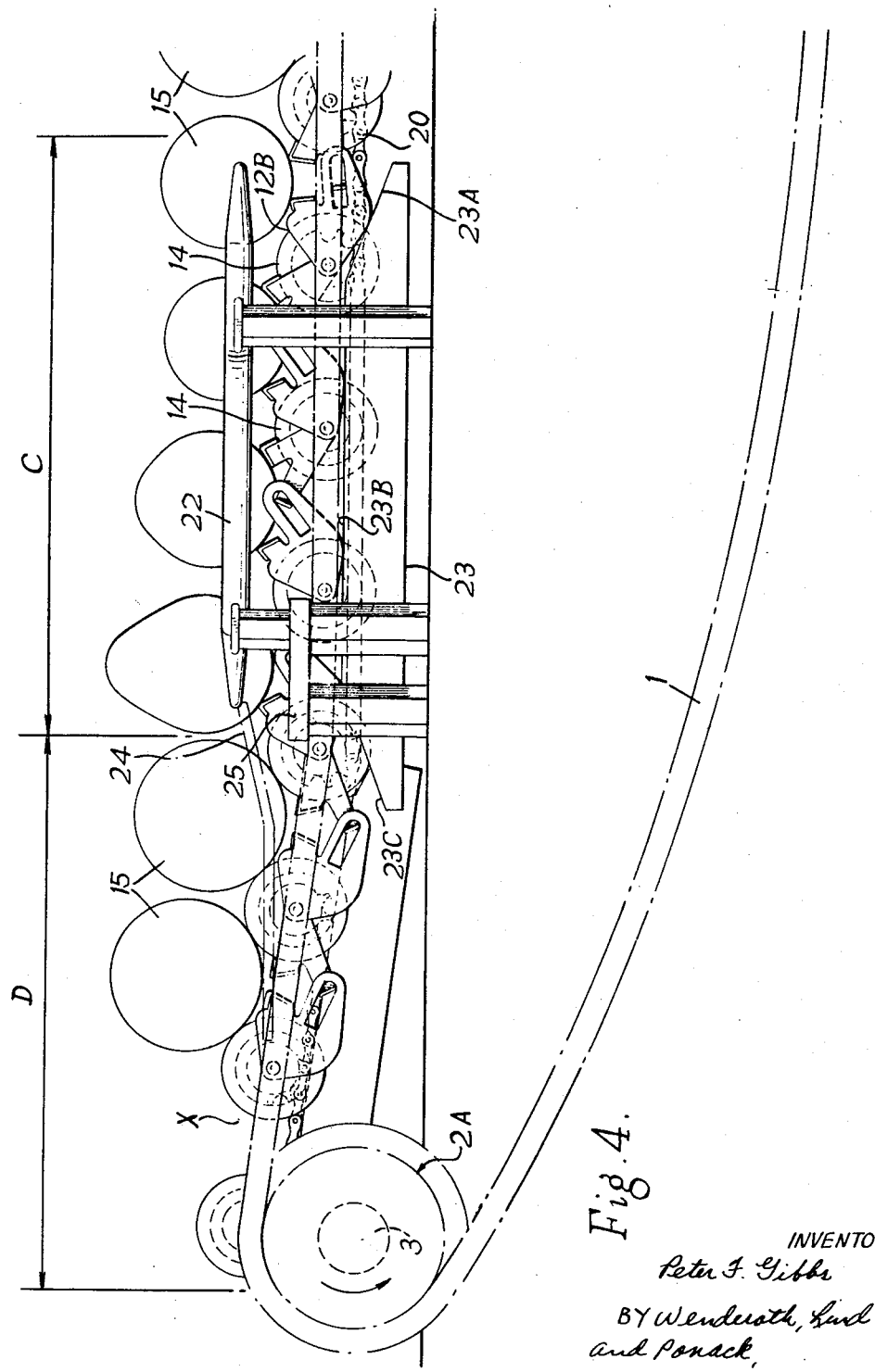

3,075,629
EGG ORIENTATING MECHANISM
Peter Frederick Gibbs, Downend, Bristol, England, assignor to Brecknell, Dolman & Rogers Limited, Bristol, England, a British company
Filed Oct. 5, 1961, Ser. No. 143,194
Claims priority, application Great Britain Aug. 23, 1961
7 Claims. (Cl. 198—33)

This invention relates to a mechanism primarily intended for orientating eggs for the purpose of ensuring that they are all similarly disposed, that is, with their small ends all pointing in the same direction, but applicable also for dealing with other ovoidal and similar asymmetrical objects. For convenience the following description will refer only to eggs.

It is known that if an egg is rested on a pair of adjacently disposed rollers, both rotating in the same direction, the egg will tend to drift lengthwise along the rollers in the direction in which the small ends of the eggs point. This action has been taken advantage of by combining pairs of rollers to form an endless conveyor which circulates said rollers through an endless path and by obstructing similarly directed eggs, which have drifted towards corresponding end of the rollers, by a device which turns such eggs over endwise.

The object of the present invention is to provide improved egg orientating mechanism of this kind, in which the turn-over action is effected without arresting or modifying the rotational movements of the rollers. This object is achieved by nullifying during the turn-over action the rotational effect of the rollers on the eggs, by temporarily elevating the eggs clear of the rollers, which continue to rotate as well as to move bodily forward, to again receive the eggs, now all pointing in the same direction.

More particularly it is an object of the present invention to provide an egg orientating conveyor comprising a framework, interconnected pairs of parallel rollers forming a circulatory endless conveyor mounted on said framework, means on said framework for continuously circulating said conveyor, a turnover device on said framework extending partway across said rollers to engage and turn over eggs supported on said paired rotating rollers and which have drifted toward the one ends of said rollers and means for lifting eggs out of contact with said rotating rollers during the turnover operation.

Figure 1:
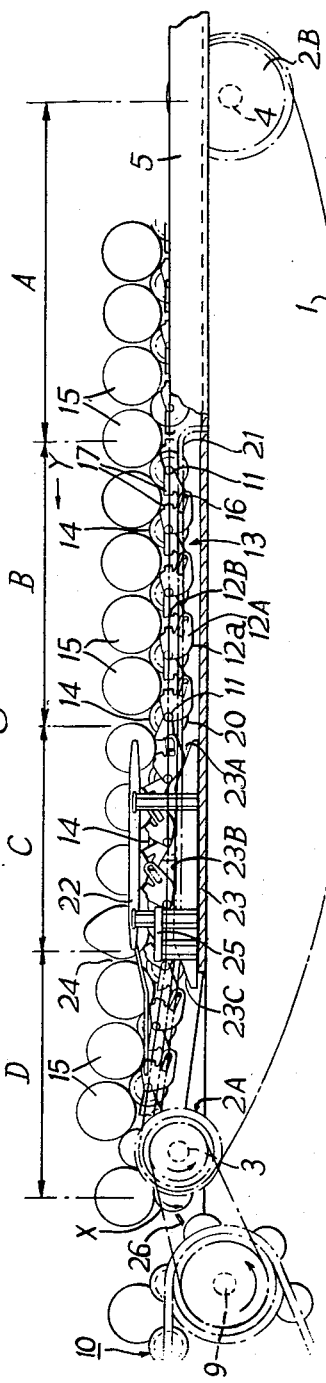
Figure 2:
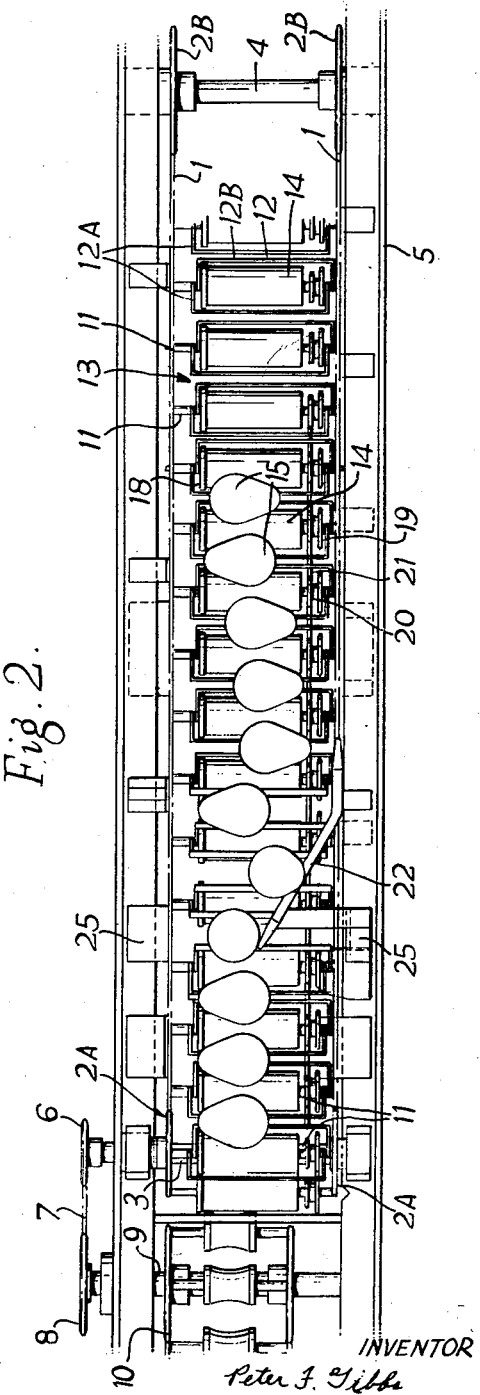
Figure 3:
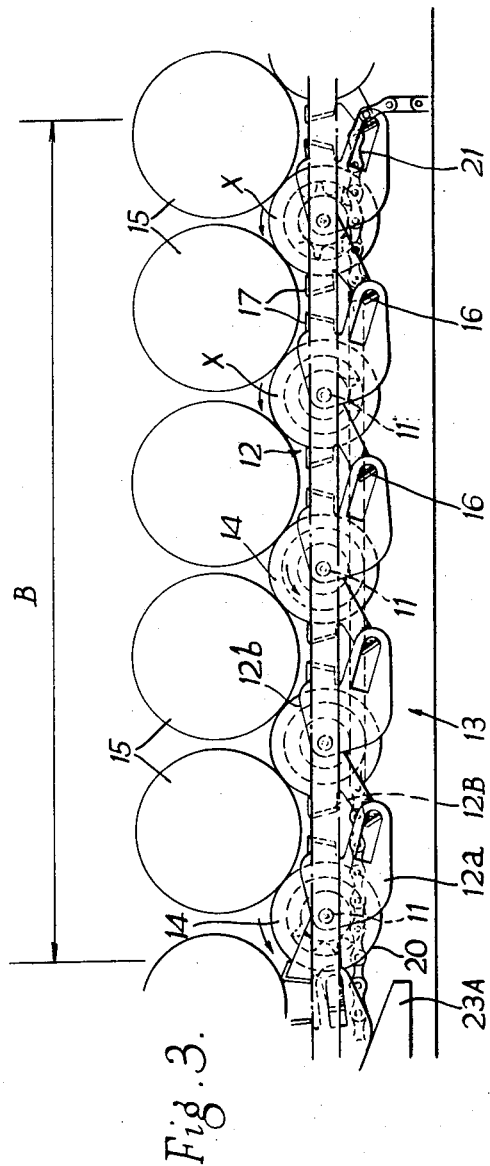

By way of example, an embodiment of an egg orientating conveyor mechanism in accordance with this invention is illustrated in the accompanying drawings, wherein FIGURES 1 and 2 are a side view and a plan view respectively, and FIGURES 3 and 4 are enlarged side views of two portions of the mechanism.

In the embodiment illustrated in the accompanying drawings two parallel endless chains 1 are supported by longitudinally spaced pairs of sprocket wheels 2A and 2B, the former being secured to a transverse shaft 3 so as to rotate therewith and the latter being carried by another transverse shaft 4; the shafts 3, 4 are journalled for rotation in a main framework 5.

The shaft 3 is provided with another sprocket wheel 6 which, by means of an endless chain 7, is drivingly connected to a further sprocket wheel 8 secured to a driven shaft 9 of a take-off conveyor 10, which may be, for example, a feed conveyor for an egg weight grading machine disposed co-axially with the framework 5. The egg orientating conveyor thus derives unidirectional continuous circulatory movement from the power driven take-off conveyor 10.

Carried by and transversely between the chains 1 of the endless conveyor, the upper run of which is substantially horizontal, are a number of equi-spaced spindles 11, each of which has rockably mounted thereon two yokes 12, said two yokes, which are mounted on spindles 11, by means of side limbs 12A, extending in opposite directions. Two yokes 12 pivoted on two adjacent spindles 11 together constitute a single cradle 13, the cross bars 12B of the cradle yokes 12 extending transversely and parallel through spaces between rollers 14, rotatably carried by the spindles 11.

Normally the yoke cross bars 12B are lowered between said rollers 14 sufficiently to clear eggs 15 being carried along on said rollers, and said cross bars 12B are caused to move together as the cradle yokes 12 rock on spindles 11, as hereinafter described, by the provision of a pin-and-slot connection 16 associated with at least one pair of side limbs 12A of paired yokes 12. The yoke cross bars 12B are adapted during operation of the mechanism to rise so that their upper edges contact with eggs 15 carried on rollers 14 and then lift said eggs above said rollers, and the egg-contacting edges of the yoke cross bars 12B are accordingly covered by a strip 17 of non-slip, preferably resilient, material, such as rubber.

Each of the rollers 14 has a flange 18 at one end, and spaced from the unflanged end of said roller is a collar 19 which is secured to the roller 14 which is freely mounted on its spindle 11, said collar 19 being of the same or substantially the same diameter as flange 18 and both being large enough to check lateral drift of the egg 15 supported on an adjacent pair of rollers 14.

Rigidly fixed between the unflanged end of each roller 14 and the associated collar 19 is a small sprocket wheel 20, forming a unitary roller assembly freely mounted on its spindle 11. The sprocket wheels 20 of all the roller assemblies are adapted, over part at least of the upper runs of chains 1, to engage a fixed rack 21 in order that rotation may be imparted to said roller assemblies as they are carried along by said chains 1. The rack 21 is conveniently composed of a length of roller chain fixed to framework 5.

Above the level of the rollers 14 is a fixed rail 22 which is inclined inwardly in relation to the direction of bodily movement of said rollers with the chains 1 and which extends about half-way across the rollers, said rail 22 serving in known manner to turn over any egg which is carried into contact therewith.

Alongside of one (or both) of the chains 1 and beneath the turn-over rail 22 a fixed cam track 23 is mounted on the framework 5, said cam track comprising an inclined lead-in or front ramp 23A, a middle horizontal surface 23B and an inclined lead-off or rear ramp 23C. The cam track 23 lies in the path of the interconnected pairs of yoke side limbs 12A, so that ramp 23A contacts with the under-edge 12a of the leading side limb 12A, and as this is coupled to the side limb 12A of the yoke on the following spindle, the two cross bars 12B of the two yokes 12 lift simultaneously. The two yokes 12 on adjacent roller spindles 11 constitute a single cradle 13 and the two yoke cross bar 12B of each cradle are sufficiently spaced apart when elevated to form a steady rest on which to lift an egg 15 from off the pair of rollers 14 between which said cross bars lie when in their lowered positions. Simultaneous pivoting of the two yokes of each cradle 12 is ensured by a pin-and-slot type connection 16 between the yoke; this conveniently is in the form of a slot 16A in one yoke side limb engaging a bent tag 16B on the other yoke side limb.

The cradles 13 are held in their egg-elevating positions for so long as the yoke limb edges 12a ride along the horizontal surface 23B. As the yoke limb edges 12a move on to the rear ramp 23C the elevated cradles 13 tend to drop into their lowered positions but to ensure positive retraction an inclined re-setting rail 24 is provided to contact with and press down on the top edge 12b of the yoke side limbs.

In the construction illustrated the chains 1 at the delivery ends of the conveyor mechanism are shown as slightly upwardly inclined, but it is to be understood that this is not essential to the functioning of the mechanism and is simply an expedient employed for practical reasons when the present invention is used in conjunction with the feed conveyor of an egg weight grading mechanism; guides 25 constrain chains 1 at places where the horizontal and inclined portions of the upper run of said chains merge together. To facilitate the transfer of eggs from the egg orientating conveyor mechanism according to the invention to the take-off conveyor 10 a bridge plate 26 is provided.

The egg orientating mechanism illustrated by the accompanying drawings operates as follows: Eggs 15 are deposited, in any suitable manner, on to the conveyor mechanism, along the zone marked "A" wherein the rollers 14 are being bodily carried along by the continuously circulating chains 1, although the rollers 14 are not yet being rotated about their respective spindles 11. When the rollers 14 enter the zone marked "B" their sprocket wheels 20 engage the fixed rack 21 to impart rotation, all in the same direction, to said rollers, thereby imparting rotational movement about their respective major axes to the eggs 15 supported by the rotating rollers. It will be appreciated that rotation could be imparted to the rollers 14 and thence to the eggs 15 by causing said rollers to frictionally engage a flat plane surface, instead of positively rotating the rollers by reason of the engagement of the associated sprocket wheels 20 with fixed rack 21, but the rate of rotation would be slower than with positively driven rollers and thus the length of the conveyor would need to be materially lengthened.

As already mentioned it is an established phenomenon that when ovoidal and similar asymmetrical objects, such as eggs, are placed on pairs of similarly rotating rollers they drift toward different ends of the rollers according to their initial, usually random, disposition. That is, in the case of eggs 15 placed on rollers 14 all rotating in one direction, namely anticlockwise (arrow X) and with the rollers moving bodily to the left (arrow Y), as viewed in FIGS. 1, 3 and 4, those eggs having their small ends directed toward the roller flanges 18 will drift until arrested by said flanges, whereas those having their small ends directed toward the roller collars 21 will drift until arrested by said collars (see FIG. 2).

If therefore a suitable obstacle, such as the rail 22, is interposed in the path of eggs arrested by collars 21, the said rail can be used to turn such eggs over automatically, that is, so as to have their small ends directed toward the roller flanges 18. It is also known, however, that some difficulty is experienced in effecting this turn-over action while an egg is rotating about its longitudinal axis by reason of being in contact with rotating rollers.

The characteristic feature of the present invention is the provision of novel means for nullifying the effect of rotation of eggs in the course of being turned over endwise. While eggs are travelling through zone "B" the yoke cross bars 12B of cradles 13 are sufficiently below the level of the rollers 14 to be clear of eggs 15 being carried bodily and rotated individually by said rollers, but as the eggs enter zone "C," which includes the turn-over section of the conveyor, the yoke cross bars 12B are caused to rise by reason of the edges 12a of yoke side limbs 12A riding up ramp 23A on to the horizontal surface 23B of cam track 23. The eggs are thus elevated out of contact with rollers 14 in zone "C," although the rollers 14 continue to rotate on their spindles 11.

When the eggs 15 have gone past the turn-over rail 22, the side limbs of the cradle yokes 12 tend under gravity action to swing down because of the lowering effect of cam ramp 23C, but they are in fact positively lowered by the resetting rail 24. The eggs 15, now with small ends all pointing in the same direction, are once more supported, within zone "D," on rotating rollers which ensure, by reason of the phenomenon referred to, that all eggs are moving in line, that is, in contact with roller flanges 18, for accurate delivery to the bobbin-like rolls of take-off conveyor 10. As the cradles 13 are carried along (in inverted positions) through the lower run of the conveyor there is a tendency for the yokes 12 to move out from between the rollers 14 and accordingly a cradle setting device (not shown) in the form of a rail similar to rail 24 may be provided in the vicinity of sprocket wheels 2B to effect positive repositioning of any misplaced yokes.

I claim:

1. Egg orientating mechanism comprising a framework, interconnected pairs of parallel rollers forming a circulatory endless conveyor mounted on said framework, means on said framework for continuously circulating said conveyor, means coupled to said rollers for rotating said rollers as they move along at least a part of the path of said conveyor, a turnover device on said framework extending partway across the portion of the path of said rollers along which they are rotated to engage and turn over eggs supported on said paired rotating rollers and which have drifted toward the one ends of said rollers and means for lifting eggs out of contact with said rotating rollers during the turnover operation.

2. Egg orientating mechanism according to claim 1, wherein the egg-lifting means comprises elements normally lying between said rollers out of contact with eggs supported on said rollers and a device for elevating said elements as they pass alongside of said turnover device.

3. Egg orientating mechanism comprising a framework, an endless conveyor mounted on said framework and composed of pairs of parallel rollers extending transversely between endless chains, means on said framework for imparting continuous circulatory movement to said endless conveyor, means on said framework for imparting rotation to said rollers about their individual axes as they are bodily transported by the continuously circulating conveyor, a turnover barrier extending partway across approximately one half of the conveyor to engage eggs carried by the rotating and transported rollers and which have drifted onto said half of the conveyor, cradles mounted between the paired rollers and normally positioned out of contact with eggs supported on the rollers and means on said framework in the region of the turnover barrier and coacting with said cradles to lift eggs out of contact with the rotating rollers during the period said eggs are passing said turnover barrier.

4. Egg orientating mechanism as claimed in claim 3, wherein said cradles comprise U-shaped yokes pivotally supported by the roller spindles, cam means being provided on said framework adjacent said barrier for temporarily pivoting said cradle yokes.

5. Egg orientating mechanism comprising a framework; an endless conveyor having a substantially horizontal upper run and consisting of a pair of parallel endless chains, pairs of chain-supporting sprockets rotatably journalled in said framework, a plurality of equi-spaced transverse spindles extending between said chains, rollers one on each of said spindles, roller sprocket wheels one on each of said spindles, transverse cradles comprising paired oppositely directed yokes pivotally supported by said spindles with cross bars of said yokes arranged between said rollers and normally retracted away from contact with eggs carried on said rollers; drive means on said framework for imparting unidirectional continuous circulatory movement to said conveyor as a whole, rack-like means on said framework for cooperating with said roller sprocket wheels to impart rotation over part of said upper run to said rollers about their respective axes as the rollers are bodily transported by said conveyor; a rail supported by said framework above said upper run, inwardly inclined in the direction of movement of said conveyor and extending approximately halfway across said upper run to engage eggs carried by said rollers which have drifted onto one half of said upper run, and cam means in the region of said rail for raising said cradles to lift eggs out of contact with the rotating and transported rollers during engagement of eggs by said rail to turn them over.

6. Egg orientating means as claimed in claim 5, having resetting means on said framework for positively returning any cradles which remain elevated after passing said cam means.

7. Egg orientating mechanism as claimed in claim 5, wherein the cradle yokes are U-shaped elements pivotally supported by the outer ends of the yoke side limbs on said roller spindles with the cross bars of adjacent pairs of yokes spaced apart to provide a transverse egg rest, the side limbs of the yokes on at least one side of the cradles being interconnected to ensure simultaneous projection of the yokes from normally retracted positions between adjacent rollers.

References Cited in the file of this patent
UNITED STATES PATENTS
2,895,489   Rostron _____ July 21, 1959